United States Patent
Loh et al.

(10) Patent No.: US 8,922,478 B2
(45) Date of Patent: Dec. 30, 2014

(54) POSITION SENSING METHOD AND POSITION SENSING APPARATUS AND ITS CONSTRUCTION

(75) Inventors: Weng Wah Loh, Filton (GB); Helen Balinsky, Cyncoed (GB); Fraser John Dickin, Almondsbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2309 days.

(21) Appl. No.: 10/917,402

(22) Filed: Aug. 13, 2004

(65) Prior Publication Data

US 2005/0083298 A1     Apr. 21, 2005

(30) Foreign Application Priority Data

Aug. 21, 2003 (GB) .................................. 0319605.2

(51) Int. Cl.
*G09G 5/00* (2006.01)
*G06F 3/044* (2006.01)

(52) U.S. Cl.
CPC ...................................... *G06F 3/044* (2013.01)
USPC ....................................................... 345/156

(58) Field of Classification Search
CPC ........ G06F 3/01; G06F 3/011; G06F 3/04886; G08B 6/00
USPC .......................................... 345/146, 156, 173
See application file for complete search history.

(56) References Cited

U.S. PATENT DOCUMENTS

| 4,352,313 | A  | * | 10/1982 | Ny ................................... 84/425 |
| 4,891,777 | A  | * | 1/1990  | Lapeyre ......................... 708/130 |
| 5,583,539 | A  | * | 12/1996 | Hiketa et al. .................. 715/823 |
| 6,323,846 | B1 | * | 11/2001 | Westerman et al. .......... 345/173 |
| 6,333,735 | B1 |   | 12/2001 | Anvekar |
| 7,203,455 | B2 | * | 4/2007  | Ernst et al. .................... 434/317 |
| 7,391,861 | B2 | * | 6/2008  | Levy ............................ 379/368 |
| 2002/0015024 | A1 | * | 2/2002 | Westerman et al. .......... 345/173 |
| 2002/0167494 | A1 | * | 11/2002 | Sherman et al. .............. 345/168 |

FOREIGN PATENT DOCUMENTS

| EP | 472 337 A1 | 2/1992 |
| GB | 1248382 A  | 9/1971 |

* cited by examiner

*Primary Examiner* — Quan-Zhen Wang
*Assistant Examiner* — Calvin C Ma (57) ABSTRACT

A position sensor is disclosed with detector elements 11 coupled to a set of output lines 20 according to a connection pattern 30. An object 2 triggers a window subset of the detector elements 11, causing a logic output on the set of output lines 20. Some output lines 20a are coupled to more that one detector element 11. However, the connection pattern 30 is arranged such that for any window subset of the detector elements falling in a variable length range, a unique logic output is provided on the set of output lines 20 to identify the position of the object. A sensing method and search process for determining the connection pattern are also disclosed.

35 Claims, 7 Drawing Sheets

POSITION SENSING METHOD AND POSITION SENSING APPARATUS AND ITS CONSTRUCTION

FIELD OF THE INVENTION

The present invention relates in general to a method and apparatus for sensing a position of an object and to the construction of such apparatus. In particular, but not exclusively, the invention relates to a method and apparatus for sensing a position of an object of unknown or variable width and to the construction of such apparatus.

BACKGROUND OF THE INVENTION

In a number of technical areas—such as the provision of touch screens—there is a need for sensing a position of an object. A position sensor should determine position accurately and reliably, whilst ideally being simple, efficient and inexpensive. This can pose considerable difficulty where it is necessary to determine a position of an object of unknown or variable width, i.e. whose size cannot be accurately predetermined. As one illustrative example, it may be desired to sense a position of an arbitrary human finger. This is problematic as each finger of a human hand is of a different width, and finger width varies substantially from person to person.

BRIEF SUMMARY OF THE INVENTION

In one aspect of the present invention there is provided a position sensor, comprising: a sensor array having a plurality of detector elements; and a set of output lines coupled to the plurality of detector elements according to a connection pattern arranged such that in use triggering any window subset of the detector elements provides a unique output on the set of output lines, wherein each window subset has a length falling in a predetermined variable length range.

The number of detector elements is greater than the number of output lines. Coupling at least some of the output lines to more than one of the detector elements advantageously reduces the total number of output lines, leading to a smaller and simpler position sensor.

Preferably, the window subset falls within a range defined between a minimum number n and a maximum number m of detector elements, where m>n. This variable length range advantageously allows the position sensor to uniquely determine position of an object even having a size that is unknown or is not accurately predictable.

Preferably, the detector elements are arranged such that consecutive detector elements are triggered in each window subset. Here, the detector elements are suitably arranged in a one-dimensional, i.e. linear, array.

In use, each detector element is triggerable by an object to generate a logic output on a respective one of the output lines. Ideally the logic output is a bi-state logic output (i.e. 1 or 0). As a result, a logic word is provided on the set of output lines which is then interpreted to determine position of the object in relation to the sensor array.

In one embodiment of the invention, each output line is represented by one abstract character in a reference alphabet (such as the letters A, B, C, D, E, etc.) and the connection pattern is defined by a string of characters taken from the reference alphabet. Each window subset of the detector elements then corresponds to a unique character combination, as a short window subset from the full connection pattern character string.

Preferably, each window subset corresponds to a unique character combination without repetition anywhere else in the connection pattern. Each character combination is preferably unique even subject to permutation. Further preferably, each character appears only once in any window subset, i.e. without duplication.

In a second embodiment of the invention, each output line is represented by a numeric value. Each window subset is represented by a combined numeric total, obtained by summing numeric values for each triggered output line. That is, the reference alphabet is a numerically weighted set such that for each window subset a unique numerical value is derived. Preferably, the reference alphabet is a sequence of power terms. Ideally, each output line is allocated one element in the binary power sequence 1, 2, 4, 8, 16, 32, . . . , such that the logic output on each of the set of output lines combine to form a binary numeric value.

A position sensing system may be provided using the position sensor defined herein and further comprising a controller arranged to receive a logic output from the set of output lines and thereby determine a corresponding absolute position of an object in relation to the sensor array. The system may also comprise a look up table arranged to store a mapping of logic outputs from the set of output lines against absolute positions of an object in relation to the position sensor. Preferably, the mapping is derived from the connection pattern between the detector elements and the output lines.

In a second aspect of the present invention there is provided a position sensor for sensing position of an object, the position sensor comprising: a plurality of sensors arranged such that a window subset of the sensors are triggered in use by an object; and a set of output lines coupled to the sensors according to a connection pattern, to provide a logic output responsive to the triggered window subset of the sensors; wherein the connection pattern is arranged such that for any window subset of the sensors, a unique logic output is provided on the set of output lines to identify a position of the object.

Preferably, each output line is represented by one character in a reference alphabet, such that the connection pattern is represented by a connection pattern character string and each window subset corresponds to a substring of characters from the connection pattern character string; there are no character duplications within any window subset; and no two window subsets contain equivalent permutations of character combinations.

Preferably, each output line is allocated one binary power term 1, 2, 4, 8, 16, etc, such that triggering a window subset of the sensors provides a logic output on the set of output lines as a combined binary numeric value.

Preferably, each window subset comprises a variable number of sensors in a predetermined range. Each window subset suitably comprises consecutive sensors from a one-dimensional array. Ideally, at least one of the output lines is coupled to more than one of the sensors, and each sensor is coupled to only a respective one of the output lines.

Preferably, the sensors or detector elements used in the position sensor are each proximity detectors. In which case, the position sensor defined herein is ideal for use as a touch strip sensor. In particular, the position sensor is ideally arranged as a biometric input device for sensing position of a human finger.

The present invention also extends to an apparatus comprising the position sensor or position sensing system defined herein. The apparatus may comprise a display screen, and a position sensor may be arranged to control a scrolling function of the display. As practical examples, the apparatus may be a cellular telephone, a personal digital assistant, or a hand held computing device.

In another aspect of the present invention there is provided a method of sensing a position of an object, using a position sensor having a plurality of detector elements coupled to a set of output lines according to a connection pattern, the method comprising the steps of: triggering a window subset of the detector elements according to a position of the object, where the window subset has a variable length within a predetermined range; and providing a logic output on the set of output lines corresponding to the triggered window subset of detector elements according to the connection pattern, such that any window subset of consecutive detector elements within the predetermined range provides a unique logic output on the set of output lines without repetition subject to permutation.

The method preferably comprises the step of mapping the logic output provided on the set of output lines to an absolute position of the object.

The method preferably comprises the step of providing on each output line either a first binary logic level where any one or more detector elements coupled to the respective output line is triggered by an object or else providing a second binary logic level, such that a pattern of binary outputs is provided as the logic output on the set of output lines.

The method preferably comprises determining a binary numeric value from the logic outputs on the set of output lines, the binary numeric value representing the absolute position of the object in relation to the detector elements.

In yet another aspect of the present invention there is provided a method of constructing a position sensor, comprising the steps of: providing a total number of detection elements L; determining a range of window subset sizes between a maximum size m and a minimum size n; allocating each of a plurality of output lines a unique character in a reference alphabet; forming a connection pattern represented by a character string of length L from the reference alphabet using a combinatorial search to determine character combinations for each window subset of between n and m consecutive characters, wherein each character combination appears in the character string only once without repetition subject to permutation; and connecting the detector elements to the output lines according to the connection pattern.

The construction method preferably comprises mapping potential outputs from the set of output lines against absolute positions of an object in relation to the detection elements. The mapping may be recorded in a look up table.

In a still further aspect of the present invention there is provided a search process for use in determining a connection pattern between a plurality of detector elements and a set of output lines, the search process comprising the steps of: defining a desired length of the connection pattern L according to a total number of the detector elements, and defining a window range of between n and m consecutive detector elements for unique position determination; allocating to each output line one element in a reference alphabet, where the reference alphabet is a sequence of binary power terms 1, 2, 4, 8, 16, 32, . . . ; selecting an initial string comprising a first m+1 elements from the reference alphabet; calculating a numeric value for each window subset of length n to m along the string as a search list; searching the search list for duplicate numeric values, and if so then returning to the selecting step to reselect the string by replacing or reordering one or more elements, or else adding an additional element to the string and returning to the calculating step; and continuing the search until a connection pattern of the desired length L is achieved.

In the preferred search process, the additional element added to the string is either an element that has already been used at least m+1 places earlier in the string, or is a previously unused element from the reference alphabet.

Preferably, the calculating step calculates m−n+1 new numeric values following addition of each additional element, and the searching step searches each of the new m−n+1 numeric values against the previous search list prior to adding each value to the search list. Hence, each new element requires only minimal extra processing, further reducing work in the search process.

Preferably, the search process includes the additional step of checking each combined numeric value to identify duplications of an element of the reference alphabet within any one window subset, ideally by checking for parity errors.

BRIEF DESCRIPTION OF THE DRAWINGS

For a better understanding of the invention, and to show how embodiments of the same may be carried into effect, reference will now be made, by way of example, to the accompanying drawings in which.

DETAILED DESCRIPTION OF THE INVENTION

Figure 1:
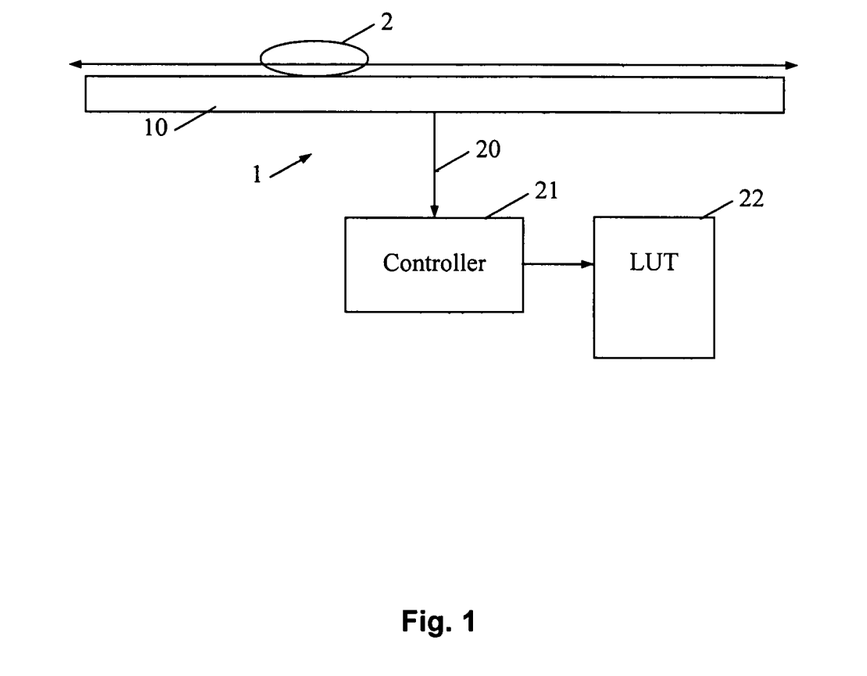
FIG. 1 is a schematic overview of a preferred position sensing system.

FIG. 1 is a schematic overview of a position sensing system according to a preferred embodiment of the present invention. The system 1 comprises a sensor array 10 coupled to a controller 21 through a set of output lines 20. The controller 21 is conveniently a microprocessor, although many other control devices are also appropriate. The controller 21 determines an absolute position of an object 2 in relation to the sensor array 10, by using a sense output provided on the output lines 20. In this example embodiment, the microprocessor controller 21 refers to a mapping stored in a look up table 22, which maps each sense output from the output lines 20 against a predetermined absolute position.

It is desired to uniquely identify the position of the object 2 in relation to the sensor array 10. However, it is also desired to minimise the number of output lines 20, which brings advantages such as allowing the system to employ a smaller and less expensive controller 21.

Further examples of the context of the invention will be described further below, but it should be noted that a particularly appropriate context for use of embodiments of the invention is use of a touch screen with a user's finger. Such touch screens are widely employed as a convenient user interface in, for example, cash machines and information displays, and potentially tablet computers and similar appliances. A user's fingertip may vary in width during the course of application to a touchscreen (generally within parameters which may be particular to each user) and different users will have fingertips of different sizes.

Figure 2:
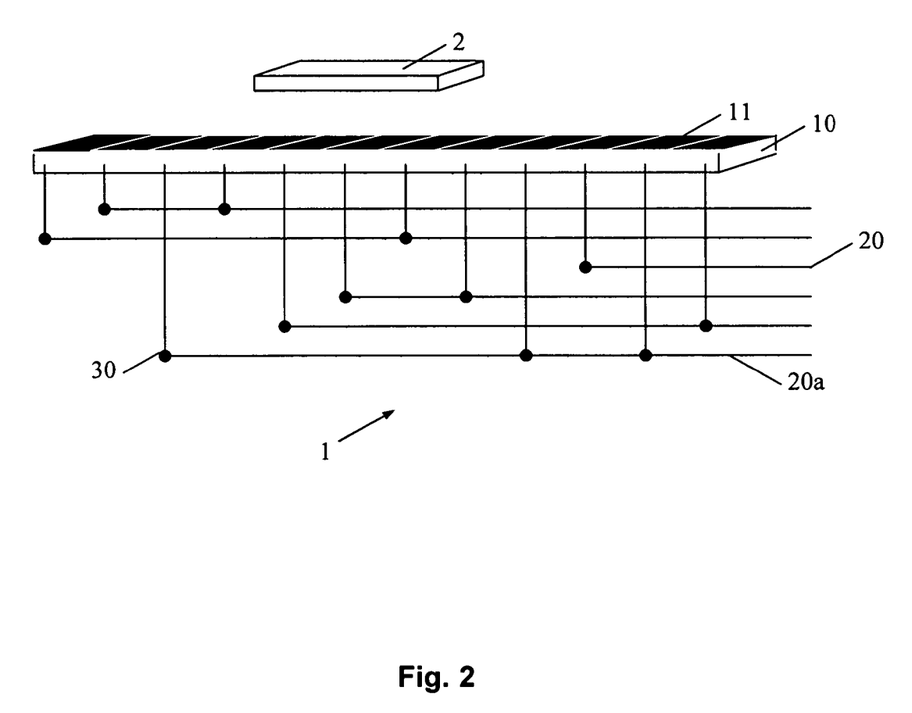
FIG. 2 is a schematic diagram of a position sensor according to a preferred embodiment of the present invention.

Referring to FIG. 2, a simplified example embodiment of the sensor array 10 is shown in more detail. In this example the sensor array 10 is arranged as a touch strip sensor, formed from a plurality of individual detector elements 11 such as proximity detectors. In use, an object 2 triggers a window subset of the detector elements 11, thereby causing an output on one or more of the output lines 20. A window subset here is a subset of the set of detector elements, all the detector elements of the subset being adjacent. The size of the window is the number of elements in the subset. Of particular significance in embodiments of the invention is the response of the system to activation of window subsets of different window sizes. The sensor array 10 comprises twelve individual detector elements 11, but requires only six output lines 20. This 2:1 ratio is achieved by coupling some of the output lines 20 to more than one of the detection elements 11, according to a predetermined connection pattern 30. For example, one of the output lines 20a is coupled to three of the detection elements 11. When the object 2 is proximate to any one of these three detection elements 11, an output is triggered on the first output line 20a. It is generally not possible to determine which one (or more) of the detector elements 11 caused this logic output. Hence, the connection pattern 30 is arranged such that, for each resolvable position of the object 2 with respect to the sensor array 10, a unique output is provided on the set of output lines 20. As a result, despite these potential positional duplications on any individual output line (e.g. line 20a), the output from the set of output lines 20 is unique for each resolvable position of the object 2.

It will be appreciated that the example sensor array of FIG. 2 has been greatly simplified. As a more realistic example it may be desired to provide a sensor having one-hundred or more individual detector elements 11 each spaced apart such as by a few millmeters. This large number of detector elements 11 generally requires a corresponding large number of output lines 20, in order to uniquely identify each resolvable position of the object 2 in relation to the sensor array 10. The number, position and spacing of the detection elements 11 is determined according to practical considerations, in particular to balance a number of resolvable positions (i.e. total number of detector elements) against position resolution (i.e. pitch distance between neighbouring detector elements).

Determination of the preferred connection pattern 30 will now be explained in more detail.

Figure 3:
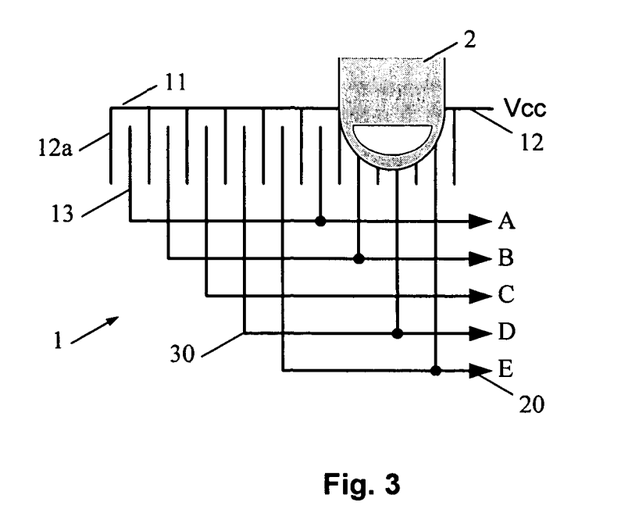
FIG. 3 is a more detailed schematic diagram of a position sensor according to a preferred embodiment of the present invention.

FIG. 3 shows another simplified example of the preferred touch-strip position sensor. Here, the detector elements 11 of the sensor array 10 are formed by a set of spur lines 12a, powered such as by a low voltage Vcc on a common rail 12, which interdigitate with a set of sense lines 13. Each detector element 11 comprises a respective one of the sense lines 13 and one of the spur lines 12a, to form an electrical impedance (i.e. resistive) proximity detector element. Although FIG. 3 illustrates resistive proximity detectors, any suitable detector technology can be employed in the present invention. For example, radiation based proximity detectors can be employed if desired, using visible light or other suitable wavelength radiation.

In operation, an object 2 triggers a consecutive window subset of the detector elements 11 and, through trigger circuitry such as a Schmitt trigger (not shown), provides a logic output on the set of output lines 20. Most conveniently, each detector element 11 causes a binary output such as a "1" signal level when the object 2 is present and a "0" signal level when no object is detected (or vice versa). Hence, a position of the object 2 in relation to the sensor array 10 is determined by a logical output, ideally a binary word of 1s and 0s, provided on the set of output lines 20.

In one preferred embodiment, the connection pattern 30 is determined as follows. Firstly, the output lines 20 are each allocated one character in a reference alphabet. Any suitable characters may be used, in any suitable order, to form the reference alphabet. Most suitably the Latin alphabet is employed, e.g. the letters "A" to "E", although for example Greek or Cyrillic characters are equally applicable. This reference alphabet is then used to compute possible connection patterns, such as by performing a brute-force longhand search. In this simplified example it is assumed that the object 2 will overlie exactly three of the detector elements 11.

Figure 4:
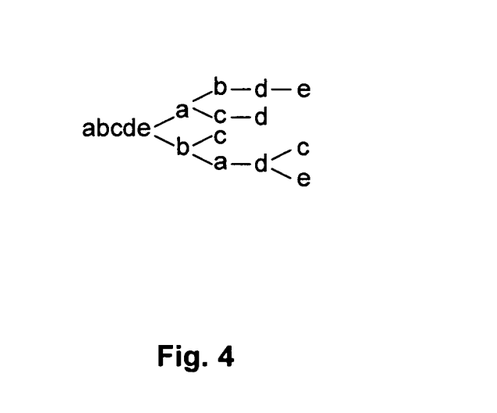
FIG. 4 shows outcomes of a tree search to determine a connection pattern in a preferred embodiment of the present invention.

FIG. 4 shows some of the outcomes formed by searching for non-repetitive combinations of any three-letter sequence from the reference alphabet of the five letters "ABCDE". In this preferred embodiment, permutations are considered to be equivalent. For example, a detection-triggered output on lines "ABD" is equivalent to an output on lines "DBA", "DAB", "BDA", etc. By defining a desired total number of connections (i.e. a total of nine connections corresponding to the nine detector elements 11), an iterative search is performed, starting with an initial set of output lines (e.g. lines A, B & C) and progressively adding more output lines (i.e. line D and then line E) until sufficient unique letter combinations are available to obtain an acceptable connection pattern.

FIG. 4 is represented as a partial tree search and shows that in this example there are several acceptable sequences of nine characters that give a unique combination for any window subset of three consecutive characters, including the illustrated sequences ABCDEABDE, ABCDEBADC, and ABCDEBADE. The sensor of FIG. 3 implements the first of these example sequences as the connection pattern 30. That is, the nine sense lines 11 are connected, in order from left to right, to the output lines ABCDEABDE, respectively.

In this simplified example, it can be seen that an object, with a width equivalent to three consecutive detector elements and present at the left-most end of the sensor array 10, will trigger detector elements 11 coupled to output lines A, B and C. When the object moves to the next resolvable position to the right, then output lines B, C and D are triggered, and so on. Hence, a unique output is provided for each resolvable position of the object 2 with respect to the sensor array 10.

Referring again to FIG. 2, this example sensor is configured to uniquely detect the position of an object that overlies any three or four consecutive detector elements 11. Hence, the object may have any width within this predetermined window range, and still be detectable.

Assuming that the six output lines 20 are allocated the characters "A" to "F" respectively, it will be appreciated that the sensor 1 implements the connection pattern ABCDEABF-CEA. It can be seen by inspection that this pattern has the property of providing a unique combination for any substring of 3 or 4 consecutive characters. That is, the connection pattern 30 provides unique position outputs for an object 2 having any width that triggers a window subset of any three or four consecutive detection elements 11 from the array 10, i.e. in a predetermined range between a minimum width that covers, in this case, three elements, and a maximum width that covers, in this case, four elements.

Figure 5:
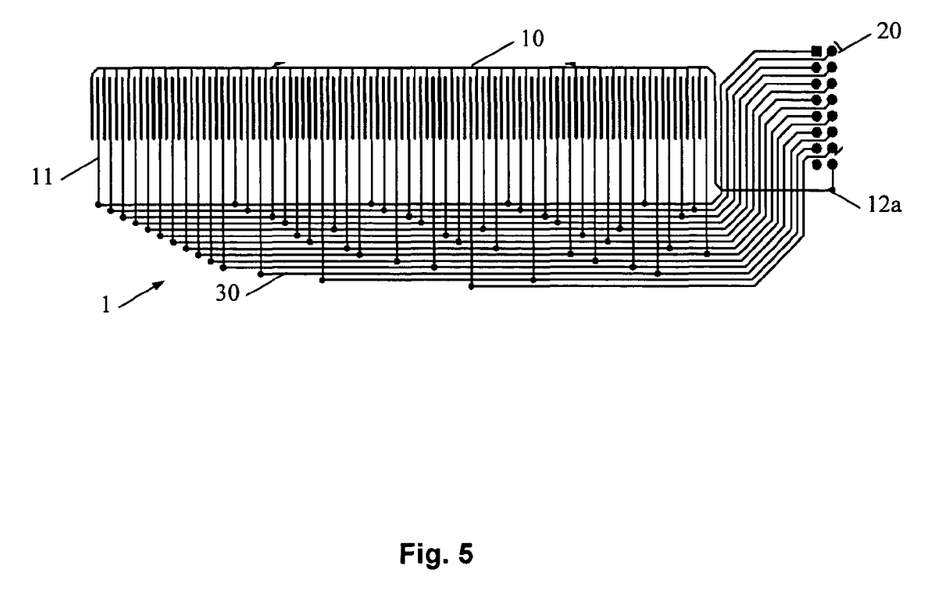
FIG. 5 is a schematic diagram of another position sensor according to a preferred embodiment of the present invention.

FIG. 5 shows another position sensor 1 to further illustrate a practical embodiment of the present invention. This position sensor 1 provides a sensor array 10 arranged on a substrate such as on a printed circuit board. The sensor array 10 comprises fifty individual detector elements 11 having a 1 mm pitch, with a total path length of 5 cm. In this configuration, it has been determined by experiment that a window range of between three and ten detection elements allows accurate and reliable detection of an object in the form of a human finger. In this case, the connection pattern 30 couples the fifty detector elements 11 to a set of only fourteen output lines 20. If the output lines 20 are represented by a reference alphabet of the letters "A" to "N", then connection pattern 30 is represented by the sequence:

ABCDEFGHIJKABLCDFGMEHIABJCDKFGNEHABMCDIFJGEKALHCBI.

By inspection it will be appreciated that this sequence provides a unique combination for any sub-string of between three and ten consecutive characters inclusive.

As another example, the same reference alphabet of the fourteen letter characters "A" to "N" is used to generate a connection pattern between one-hundred detector elements and just fourteen output lines, again for a window range of three to ten consecutive detector elements. This example embodiment has a compression a ratio of 100:14, i.e., over 7:1. Hence the present invention is particularly advantageous for larger (longer) sensor arrays. Here, the example sequence is:

ABCDEFGHIJKABLCDFGMEHIABJCDKFGNEHABMCDIFJGEKALHCBI
DNFEJAGHCMIKBDEJLAFCGIMBDHNJAFKCEIBGDHLJFKMACEB
GHL.

These connection patterns 30 each have two properties which are simultaneously true:

1. There are no duplications within any sub-window character sequence (i.e. "ABBD" is not allowed because "B" appears twice); and
2. Each sub-window character sequence is unique, i.e. is not repeated anywhere else in the connection pattern even subject to permutations (i.e. "ABCD"="ADCB"="DABC", etc).

A longhand combinatorial search process to determine the connection pattern 30 of FIG. 5 requires substantial computing resources and may take several days to execute, even with powerful modern personal computer systems. Also, the search increases exponentially with the number of output lines.

The character-based reference alphabet illustrated above is ideal for human comprehension, but is difficult to apply in complex practical situations. Hence another aspect of the present invention provides a substantially simplified search process.

Table 1 below illustrates a preferred tabular layout for replacing a character-based reference alphabet instead with a numeric-based alphabet. Here, each output line 20 is represented by a unique weighted numeric value. Most conveniently the set of output lines are represented as a basis of a numeric counting system, ideally a binary system. Each output line is represented by one of a sequence of power terms $b^n$, where b is the base and n increases for each additional output line. It is now possible to calculate a unique numeric representation for each logic output on the set of output lines, by reading the logic outputs as a combined numeric (i.e. binary) value.

TABLE 1

| Output line (n) | 0 | 1 | 2 | 3 | 4 | 5 | ... |
|---|---|---|---|---|---|---|---|
| Character-based alphabet | A | B | C | D | E | F | ... |
| Binary base system $2^n$ | 1 | 10 | 100 | 1000 | 10000 | 100000 | ... |
| Decimal equivalent | 1 | 2 | 4 | 8 | 16 | 32 | ... |
| Decimal base system $10^n$ | 1 | 10 | 100 | 1,000 | 10,000 | 100,000 | ... |

For example, a detection-triggered output on the three output lines A, B and D is interpreted as a combined binary value of 0001+0010+1000=1011 (where line A in this case is treated as the least significant bit, and all other lines including line C return a 0 value). Any repetition of this character combination elsewhere in the connection pattern produces the same combined binary value, such that repetitions are easily identified.

Also, permutations are readily determined because the same combined binary value is obtained. For example, an output on lines D, A and B would return the same numeric value as the output for lines A, B & D, i.e. ABD=DAB=1011.

The preferred search process employs this numeric representation to gain a substantial speed advantage. Each of the many possible logic outputs on the set of output lines 20 is treated as a combined numeric value and recorded. A numeric search of the recorded values therefore allows unwanted repetitions or permutations in a proposed connection pattern to be determined swiftly and inexpensively. Conversely, the numeric search determines whether a proposed connection pattern does indeed have the desired property of providing unique position outputs for an object having a desired width. In particular, the numeric search is cost-effective even when performing a combinatorial search in relation to variable object widths for window subsets in a long predetermined range (of say 3 to 10 detector elements).

Ideally, it is also desired to avoid character duplications within any one window subset. As an example, resolving a detection-triggered output on the four output lines B, C, F, G provides a combined binary value of 1100110. By contrast, a sequence containing the line C twice, e.g. BCCG=1000110, contains only three is whereas four were expected. Hence a duplication is easily determined by a parity error; it does not trigger an expected number of is in the output word. Hence, the numeric search process preferably includes the additional step of checking each combined numeric value to identify character duplications, ideally by checking for parity errors.

Figure 6:
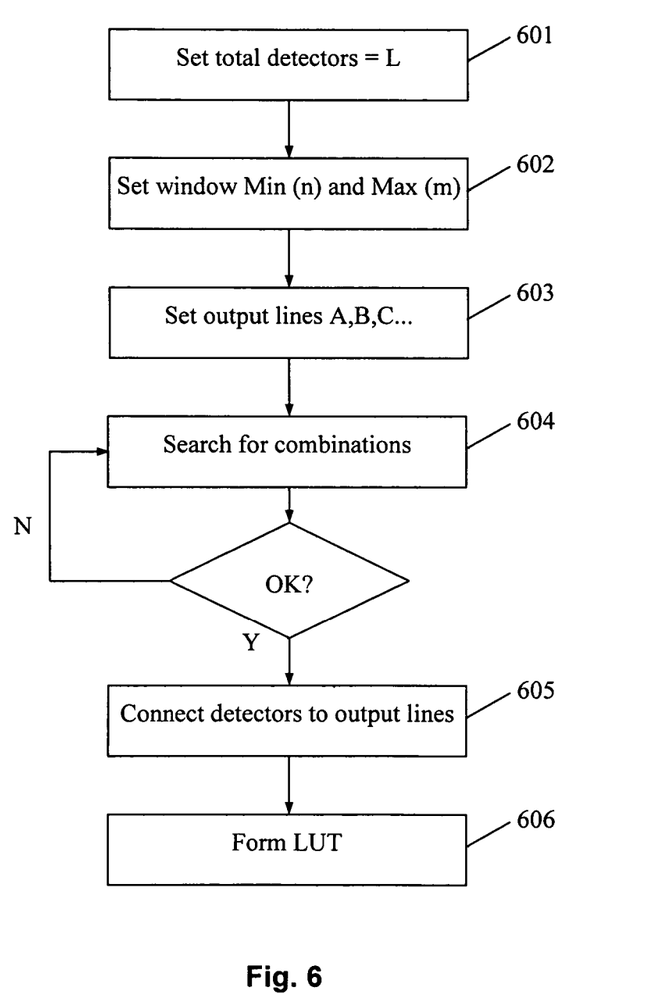
FIG. 6 is a flow diagram of a preferred method for constructing a position sensor, according to an embodiment of the present invention.

FIG. 6 shows a preferred method of constructing a position sensor, which advantageously may employ this numeric search process.

In step 601, a desired total number (L) of detection elements 11 is determined. When constructing a sensor appropriate to variable width objects, in step 602 a window range (k) is determined bounded by a maximum (m) and a minimum (n) lengths, where n<=k<=m.

In step 603, a set of output lines are each allocated a unique character in a reference alphabet. The reference alphabet can be character based, e.g. the letters A, B, C, etc., but ideally each output line is represented by a numeric value, most conveniently as a sequence of power terms. Most preferably a binary weighted set is used to represent each output line, i.e. the sequence of power terms in base 2, i.e. 1, 2, 4, 8, etc.

However, many other numeric patterns also provide the desired property of providing unique combined numeric values for each window subset.

Step 604 comprises forming a connection pattern of the desired length L from the reference alphabet. A character-based search requires sequentially searching for character combinations in the window range k (i.e. between n and m consecutive characters) for each object position without repetition subject to permutation. A numeric search computes representative numeric values for each object position. The search continues until a connection pattern of length L has been determined. If the desired connection pattern length L cannot be achieved with the current set of output lines, then the search is repeated with a greater number of output lines to provide a larger reference alphabet.

In step 605, the detection elements 11 are connected to the set of output lines 20 according to the determined connection pattern.

In step 606, the connection pattern is recorded, suitably in a look up table, in order to map each potential logical output from the set of output lines 20 against the corresponding absolute position of the object 2 in relation to the sense array 10. Ideally, the unique numeric value for each expected logic output is used to index the look up table, e.g. in monotonic order. Conveniently, the numeric values are arranged in a search pattern such as a binary tree search, in order to speed access to the look-up table.

It will be appreciated that this construction method is readily adapted according to the desired window range k and the desired total number of detector elements L, in order to produce a position sensor specifically adapted to the requirements of a particular practical situation.

Figure 7:
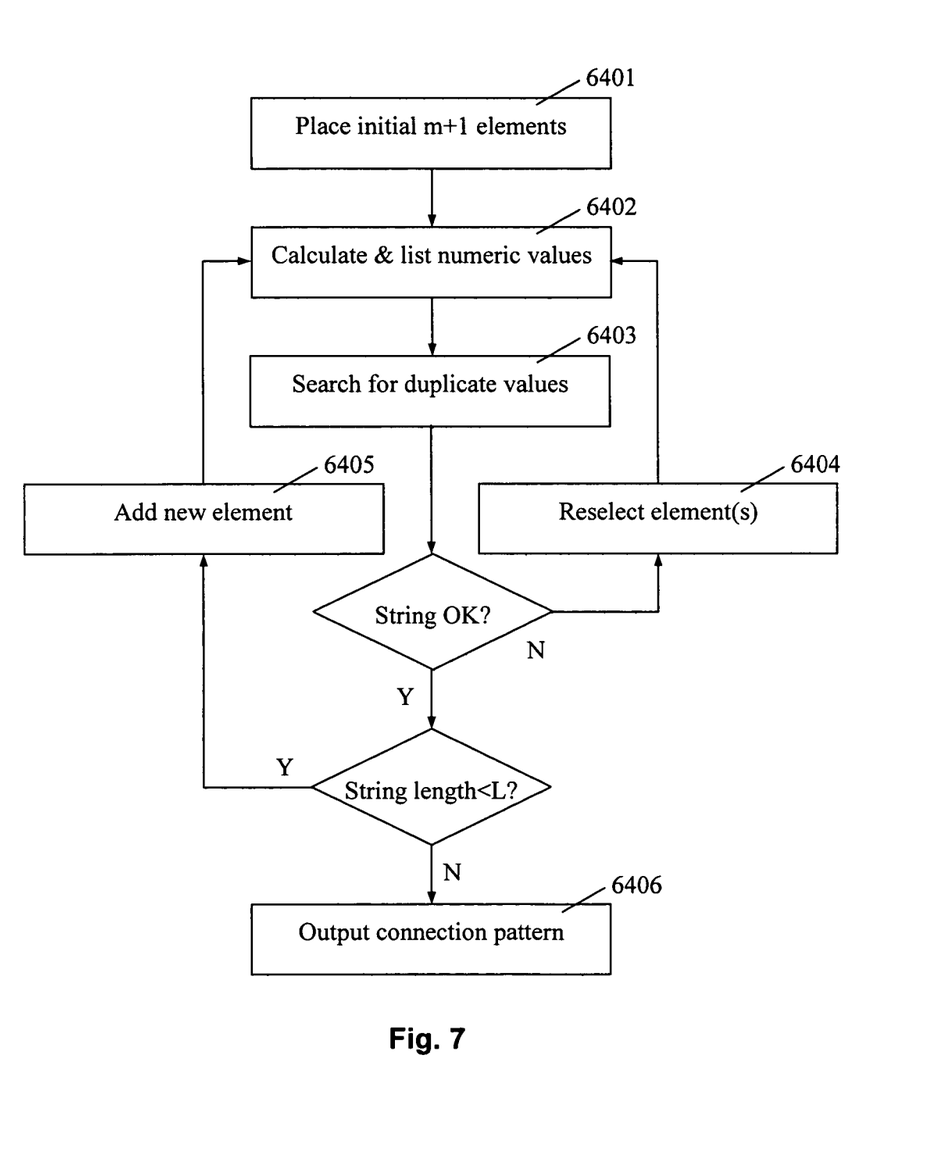
FIG. 7 is a flow diagram of a preferred method for determining a connection pattern using numeric searching.

FIG. 7 illustrates the step 604 in more detail, which preferably comprises the following sub-steps. In step 6401, the search is initialised with an initial string by selecting a first m+1 elements from the reference alphabet. In step 6402, a numeric value is calculated for each window subset of length n to m along the initial string and recorded such as in a search list. This step preferably includes checking each combined numeric value to identify character duplications, such as by checking for parity errors. In step 6403, the numeric value of each window subset is confirmed as unique by comparison against each other numeric value in the current search list. If repetitions of a numeric value are observed, then the string is not valid and must be reselected at step 6404. Otherwise, in step 6405, an additional element is added to the string. This additional element can be either an element that has already been used at least m+1 places earlier in the string (i.e. to show that multiple connections are to be made to the same output line, but without duplications in the desired window range), or a previously unused element from the reference alphabet (i.e. representing a previously unused output line). The process returns to step 6402 such that numeric values are determined for the new m−n+1 window subsets and added to the search list. Step 6403 is then repeated by comparing the new numeric values against this updated search list. Again, if a repetition is found then the string is reselected, i.e. one or more elements are discarded from the string and different new element(s) applied. The search continues until a connection pattern of the desired length L is achieved at step 6406.

The search process can be visualised as a tree search, similar to FIG. 4 above. Here, the search is performed as a depth-first search. Since the number of possibilities is finite (albeit potentially very large) then eventually searching down a particular branch reaches a terminating node. If this path is of the desired length L then the search can stop; otherwise, the branch is retraced one or more levels and other possible routes are explored.

Figure 8:
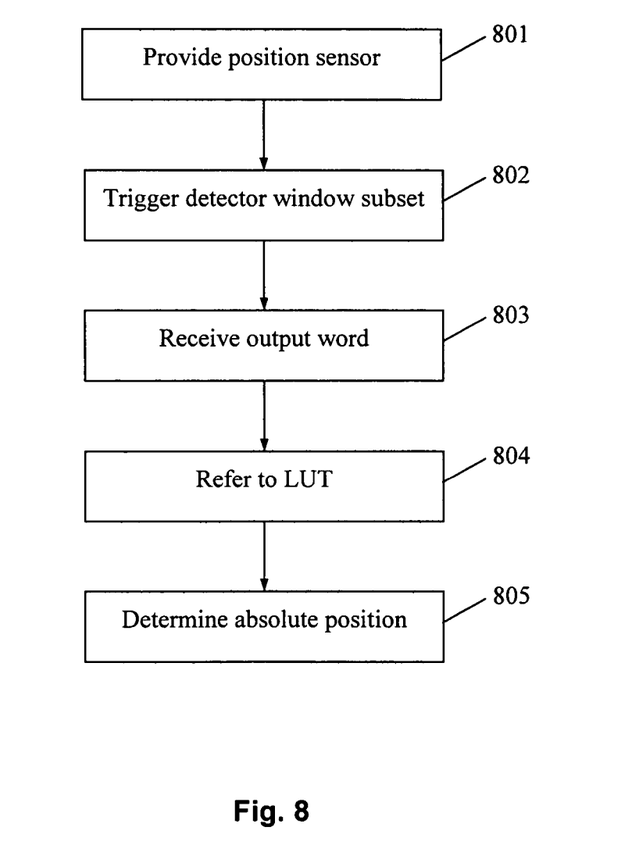
FIG. 8 is a flow diagram of a preferred position sensing method according to an embodiment of the present invention.

FIG. 8 illustrates a preferred method of position sensing, according to an embodiment of the present invention.

In step 801, a position sensor is provided as described above and arranged relative to an object to be sensed. Here, it is desired to determine an absolute position of the object in relation to the sensor 1. In step 802, the object triggers a window subset of detectors 11 from the sensor array 10. In step 803, a corresponding logical output is provided on the set of output lines 20 through the connection pattern 30, ideally as a binary numeric value. In step 804, the logical output is used to reference a stored look up table. At step 805, an absolute position of the object is returned from the look up table. Referring to the example connection patterns discussed above, it can be seen that adjacent positions may cause substantially different outputs on the set of output lines 20, and it is possible that there will be little or no correlation between one position and its immediate neighbours. Hence, it is convenient to use the look up table 22 to map a logical pattern output on the set of output lines 20 to a real-world absolute position of the object 2 with respect to the sensor array 10. In this method, determination of an absolute position of an object is fast, simple and requires minimal computational resources.

The position sensor described above is intended to obtain a generally one-dimensional position determination. That is, a position of the object 2 is determined in relation to a generally linear sensor array 10. The sensor array 10 is conveniently arranged along a substantially rectilinear sense path or track. However, many other geometric forms of one-dimensional sense path are also applicable. As just some examples, a curved, spiral, circular path can be employed, with an object position being determined along the length of the sense path. The position sensor can also be constructed to determine position in more than one dimension. Where a two or n-dimensional array of detector elements is coupled to a set of output lines, the search process to determine the connection pattern is expanded to each n-dimension.

The preferred position sensor described herein is ideally suited for use as a biometric touch sensor, such as for a user's finger. In one specific example embodiment, the position sensor is used to control scrolling movement of a display screen. Hence, the position sensor is particularly useful for incorporation into a hand-held device such as a cellular telephone, a personal digital assistant, or a portable computing device, amongst many others.

Even though an imprint of a user's finger may vary greatly in use due to factors such as the width of the user's fingers, which finger is employed, and even the pressure applied by the user, the position sensor, by use of a window range, is still able to function accurately and reliably. Also, the preferred position sensor minimises inaccuracies due to, for example, detector imperfections or switching bound of detector elements at edges of an object. The preferred position sensor uses a minimum number of components and can be implemented in a cost effective form.

Another advantage of the present invention lies in that imperfect measurement results caused such as by high frequency jitter can be avoided. An object that jitters but always remains within the predetermined maximum window range still has a uniquely determinable position.

As another advantage, an object need not at all times completely overlie the sensor array. An object that covers a large window subset of the detection elements when in the middle of the sensor array is still detectable even when the object overlies only a smaller window subset of the detection elements, such as when at the ends of a linear array. Hence, the effective length of the sensor array is extended, allowing a smaller position sensor to be made for the same effective track length.

Although a few embodiments of the present invention have been shown and described, it will be appreciated by those skilled in the art that changes may be made in these embodiments without departing from the scope of the invention, as defined in the appended claims.

The invention claimed is:

1. A touch screen device, comprising:
a sensor array having a plurality of detector elements; and
a set of output lines coupled to the plurality of detector elements according to a connection pattern arranged such that the number of detector elements is greater than the number of output lines, and that in use triggering any window subset of the detector elements provides a unique output on the set of output lines, wherein each window subset has a length falling in a predetermined variable length range,
wherein each output line is represented by a unique numeric value, such that each window subset is represented by a combined numeric total obtained by summing numeric values for each triggered output line,
wherein each of the plurality of detector elements is coupled to only one output line of the set of output lines, and
wherein the unique output correlates to an absolute position of an object in relation to the touch screen device.

2. The touch screen device of claim 1, wherein each window subset of the detector elements falls within a range defined between a minimum number n and a maximum number m of detector elements, where m>n.

3. The touch screen device of claim 1, wherein the window subset comprises consecutive detector elements.

4. The touch screen device of claim 1, wherein the detector elements are arranged in a linear array.

5. The touch screen device of claim 1, wherein each detector element is triggerable by an object in order to generate a logic output on a respective one of the output lines.

6. The touch screen device of claim 1, wherein each numeric value appears only once in any one window subset, without duplication.

7. The touch screen device of claim 1, wherein each output line is represented by one of a numerically weighted set such that for each window subset a unique numerical value is derived.

8. The touch screen device of claim 7, wherein the numerically weighted set is a sequence of power terms.

9. The touch screen device of claim 1, wherein each output line is allocated one element in a binary power sequence, such that each logic output the set of output lines combines to form a binary numeric value.

10. The touch screen device of claim 1, wherein the detector elements are each proximity detectors.

11. The touch screen device of claim 1, wherein a look up table is used to correlate the absolute position of the object in relation to the touch screen device.

12. A position sensing system comprising:
a touch screen device having a sensor array with a plurality of detector elements and a set of output lines coupled to the plurality of detector elements according to a connection pattern arranged such that the number of detector elements is greater than the number of output lines, and that in use triggering any window subset of the detector elements provides a unique output on the set of output lines, wherein each window subset has a length falling in a predetermined variable length range; and
a controller arranged to receive the unique output from the set of output lines and thereby determine a corresponding absolute position of an object in relation to the touch screen device,
wherein each output line is represented by one alphabet and each window subset of the detector elements corresponds to a combination of alphabets, wherein an alphabet only appears once in any window subset, and
wherein each of the plurality of detector elements is coupled to only one output line of the set of output lines.

13. The position sensing system of claim 12, wherein a look up table is used to correlate the absolute position of the object in relation to the touch screen device.

14. The position sensing system of claim 13, wherein contents of the look up table are determined from the connection pattern between the detector elements and the output lines.

15. A touch screen device for sensing a position of an object, the touch screen device comprising:
a plurality of sensors arranged such that a window subset of the sensors are triggered in use by the object; and
a set of output lines coupled to the sensors according to a connection pattern arranged such that the number of sensors is greater than the number of output lines, the set of output lines configured to provide a logic output responsive to the triggered window subset of the sensors,
wherein the connection pattern is arranged such that for any window subset of the sensors, a unique logic output is provided on the set of output lines,
wherein each output line is allocated one unique numeric value, such that triggering a window subset of the sensors provides the unique logic output on the set of output lines as a combined numeric value,
wherein each of the plurality of sensors is coupled to only one output line of the set of output lines, and
wherein the unique logic output correlates to an absolute position of the object in relation to the touch screen device.

16. The touch screen device of claim 15, wherein:
there are no character duplications within any window subset; and
no two window subsets contain equivalent permutations of character combinations.

17. The touch screen device of claim 15, wherein the window subset comprises a variable number of sensors in a predetermined range.

18. The touch screen device of claim 15, wherein the window subset comprises consecutive sensors in a one-dimensional array.

19. The touch screen device of claim 15, wherein at least one of the output lines is coupled to more than one of the sensors, and each sensor is coupled to only a respective one of the output lines.

20. The touch screen device of claim 15, wherein a look up table is used to correlate the absolute position of the object in relation to the touch screen device.

21. A touch screen device for sensing a position of a human finger comprising a position sensor having a sensor array with a plurality of detector elements and a set of output lines coupled to the plurality of detector elements according to a connection pattern arranged such that the number of detector elements is greater than the number of output lines, and that in use triggering any window subset of the detector elements provides a unique output on the set of output lines, wherein each window subset has a length falling in a predetermined variable length range,     wherein each output line is represented by one alphabet and each window subset of the detector elements corresponds to a unique character combination, wherein there are no character duplications within any window subset,     wherein each of the plurality of detector elements is coupled to only one output line of the set of output lines, and     wherein the unique output correlates to an absolute position of the human finger in relation to the touch screen device.

22. The touch screen device of claim 21, wherein a look up table is used to correlate the absolute position of the human finger in relation to the touch screen device.

23. A touch screen device for sensing a position of a human finger comprising a position sensor having:

a plurality of sensors arranged such that a window subset of the sensors are triggered in use by the human finger; and     a set of output lines coupled to the sensors according to a connection pattern, to provide a logic output responsive to the triggered window subset of the sensors,     wherein the connection pattern is arranged such that for any window subset of the sensors, a unique logic output is provided on the set of output lines to identify an absolute position of the human finger in relation to the touch screen device;

wherein each output line is represented by one abstract character in a reference alphabet and the connection pattern is defined by a string of characters taken from the reference alphabet, such that each window subset of the detector elements corresponds to a unique character combination, wherein there are no character duplications within any window subset, and wherein each of the plurality of sensors is coupled to only one output line of the set of output lines.

24. The touch screen device of claim 23, wherein a look up table is used to correlate the absolute position of the human finger in relation to the touch screen device.

25. A computing apparatus comprising:

a display screen; and a touch screen having a sensor array with a plurality of detector elements and a set of output lines coupled to the plurality of detector elements according to a connection pattern arranged such that the number of detector elements is greater than the number of output lines, and that in use triggering any window subset of the detector elements provides a unique output on the set of output lines, wherein each window subset has a length falling in a predetermined variable length range,     wherein each output line is represented by one abstract character in a reference alphabet and the connection pattern is defined by a string of characters taken from the reference alphabet, such that each window subset of the detector elements corresponds to a unique character combination, wherein there are no character duplications within any window subset;

wherein the position sensor is arranged to control a scrolling function of the display screen,     wherein each of the plurality of detector elements is coupled to only one output line of the set of output lines, and     wherein the unique output correlates to an absolute position of an object in relation to the touch screen.

26. The computing apparatus of claim 25, wherein a look up table is used to correlate the absolute position of the object in relation to the touch screen.

27. The computing apparatus of claim 25, wherein the computing apparatus is a cellular telephone, a personal digital assistant, or a handheld computing device.

28. A method of sensing a position of an object, using a touch screen device having a plurality of detector elements coupled to a set of output lines according to a connection pattern arranged such that the number of detector elements is greater than the number of output lines, the method comprising:

triggering a window subset of the detector elements according to a position of the object, where the window subset has a variable length within a predetermined range;

providing a logic output on the set of output lines corresponding to the triggered window subset of detector elements according to the connection pattern, such that any window subset of consecutive detector elements within the predetermined range provides a unique logic output on the set of output lines without repetition subject to permutation,     wherein each output line is represented by one abstract character in a reference alphabet and the connection pattern is defined by a string of characters taken from the reference alphabet, such that each window subset of the detector elements corresponds to a unique character combination, wherein there are no character duplications within any window subset,     wherein each of the plurality of detector elements is coupled to only one output line of the set of output lines,     wherein the unique logic output correlates to an absolute position of an object in relation to the touch screen device.

29. The method of claim 28, wherein a look up table is used to correlate the absolute position of the object in relation to the touch screen device.

30. A method of constructing a position sensor, comprising:

providing a total number of detection elements L;

determining a range of window subset sizes between a maximum size m and a minimum size n;

allocating each of a plurality of output lines a unique character in a reference alphabet;

forming a connection pattern represented by a character string of length L from the reference alphabet using a combinatorial search to determine character combinations for each window subset of between n and m consecutive characters, wherein each character combination appears in the character string only once without repetition subject to permutation;

connecting the detector elements to the output lines according to the connection pattern, wherein each of the detector elements is coupled to only one output line of the plurality of output lines; and     mapping potential outputs from the set of output lines against absolute positions of an object in relation to the detection elements.

31. The method of claim 30, further comprising recording the mapping in a look up table.

32. A search process for use in determining a connection pattern between a plurality of detector elements and a set of output lines, the search process comprising:

defining a desired length of the connection pattern L according to a total number of the detector elements, and defining a window range of between n and m consecutive detector elements for unique position determination;

allocating to each output line one element in a reference alphabet, where the reference alphabet is a sequence of binary power terms;

selecting an initial string comprising a first m+1 elements from the reference alphabet;

calculating a numeric value for each window subset of length n to m along the string as a search list;

searching the search list for repeated numeric values, and if so then returning to the selecting step to reselect the string by replacing or reordering one or more elements, or else adding an additional element to the string and returning to the calculating step; and continuing the search until a connection pattern of the desired length L is achieved.

33. The search process of claim 32, wherein the additional element added to the string is either an element that has already been used at least m+1 places earlier in the string, or is a previously unused element from the reference alphabet.

34. The search process of claim 32, wherein the calculating process calculates m−n+1 new numeric values following addition of each additional element, and the searching step searches each of the new m−n+1 numeric values against the previous search list prior to adding each value to the search list.

35. The search process of claim 32, comprising checking each combined numeric value to identify duplications of an element of the reference alphabet within any one window subset.

\* \* \* \* \*

UNITED STATES PATENT AND TRADEMARK OFFICE
CERTIFICATE OF CORRECTION

| | | |
|---|---|---|
| PATENT NO. | : 8,922,478 B2 | Page 1 of 1 |
| APPLICATION NO. | : 10/917402 | |
| DATED | : December 30, 2014 | |
| INVENTOR(S) | : Weng Wah Loh et al. | |

It is certified that error appears in the above-identified patent and that said Letters Patent is hereby corrected as shown below:

On the title page, item (30), Foreign Application Priority Data, in column 1, line 1, delete "0319605.2" and insert -- 0319605.3 --, therefor.

Signed and Sealed this
Seventh Day of July, 2015

Michelle K. Lee
*Director of the United States Patent and Trademark Office*